United States Patent
Bird

(10) Patent No.: US 9,739,204 B2
(45) Date of Patent: Aug. 22, 2017

(54) IGNITER FOR A GAS TURBINE

(71) Applicant: Derek A. Bird, Oviedo, FL (US)

(72) Inventor: Derek A. Bird, Oviedo, FL (US)

(73) Assignee: Siemens Energy, Inc., Orlando, FL (US)

(*) Notice: Subject to any disclaimer, the term of this patent is extended or adjusted under 35 U.S.C. 154(b) by 1049 days.

(21) Appl. No.: 13/890,368

(22) Filed: May 9, 2013

(65) Prior Publication Data
US 2014/0345250 A1    Nov. 27, 2014

(51) Int. Cl.
*F02C 7/266* (2006.01)

(52) U.S. Cl.
CPC ........ *F02C 7/266* (2013.01); *F05D 2260/941* (2013.01); *F05D 2260/99* (2013.01); *Y10T 29/49716* (2015.01)

(58) Field of Classification Search
CPC .................................. F02C 7/264; F02C 7/266
USPC .................. 60/776, 39.821–39.828
See application file for complete search history.

(56) References Cited

U.S. PATENT DOCUMENTS

| 2012/0110975 A1* | 5/2012 | Alholm .................. F02C 7/266 60/39.827 |
| 2012/0279195 A1 | 11/2012 | Sutcu et al. |

* cited by examiner

*Primary Examiner* — Craig Kim

(57) ABSTRACT

A gas turbine igniter includes an igniter rod disposed within a guide tube configured for travel between a hot-end region and a cold-end region and a cap connected to the guide tube, the cap defining an access passageway for the igniter rod. An attachment structure is provided for reducing the moment loading at the cold end of the igniter rod. The attachment structure has threaded outer surface configured to engage in a threaded connection with a threaded inner surface of the cap in an end portion of the cap that is proximate to the cold-end region, whereby the attachment structure is attachable to the end portion of the cap via the threaded connection. An inner surface of the attachment structure forms a guide surface for the igniter rod, at a reduced radial clearance with the igniter rod in comparison to the cap, proximate to the cold-end region.

9 Claims, 4 Drawing Sheets

IGNITER FOR A GAS TURBINE

FIELD OF INVENTION

Embodiments illustrated herein relate to gas turbine engines, particularly to a gas turbine engine igniter.

BACKGROUND OF INVENTION

An igniter for a gas turbine engine should be capable of reliably and cost-effectively igniting a combustible mixture during numerous starts that occur throughout operational cycles of the engine. The igniting function is generally accomplished by electrically-generating a spark across a gap formed between oppositely charged electrodes in a retractable igniter rod. The igniter rod may be a slender columnar structure, which in an ignition-position is deployed into a path of the combustible mixture (e.g., hot gas path) in a combustion chamber. The ignition takes place when velocity and pressure of compressed air in the chamber reach predetermined values.

After ignition, the igniter rod is designed to retract (e.g., to a retracted-position) into a protective structure (e.g., a guide tube) away from the hot combustion environment in response to continued compressor discharge pressure in the chamber throughout a working operational cycle of the engine. A cap is connected to the cold-end of the guide tube, which provides an access passageway for the igniter rod.

The generally slender columnar structure of the igniter rod could make it susceptible to vibration, which commonly develops during normal engine operation, and/or to a load magnification due to cantilever beam loading. In certain situations, this moment loading (e.g., due to gravity on the igniter rod and/or the weight of electrical cables suspended at the cold-end of the rod), could lead to undesirable mechanical-pinching conditions that could affect the movement of the igniter rod within the guide tube near the hot-end of the igniter.

SUMMARY OF INVENTION

An object of the present technique is to reduce the moment loading at the cold end of the igniter rod, by way of reducing the radial clearance of the igniter rod proximate to the cold-end region.

For this purpose, an attachment structure is proposed. The attachment structure has a threaded outer surface configured to engage with a threaded inner surface of the cap in an end portion of the cap that is proximate to the cold-end region, whereby the attachment structure is attachable to the end portion of the cap via the threaded connection. An inner surface of the attachment structure forms a guide surface for the igniter rod near the cold-end of the igniter rod. The guide surface has a significantly reduced radial clearance with the igniter rod in comparison to the cap. As a result, the radial movement of the igniter rod due to moment loading at its cold end (e.g., due to gravity on the igniter rod and/or the weight of electrical cables suspended at the cold-end of the rod) is reduced. The threaded connection provides simple assembly of the attachment structure, which may thus be conveniently retrofitted to the cap of an existing gas turbine igniter.

In one embodiment, the attachment structure is embodied as a bushing-bearing assembly, including a bushing and a bearing attached to an inner surface of the bushing. An outer diameter of the bushing is sized to interface with the inner diameter of the cap. An outer surface of the bushing is configured as the threaded outer surface that engages with the threaded inner surface of the cap at the end portion of the cap proximate to the cold-end region. The inner surface of the bearing forms the guide surface for the igniter rod within the cap proximate to the cold-end region.

In a further embodiment, the bushing is formed as split bushing having first and second bushing parts. Correspondingly, the bearing is formed as a split bearing having first and second bearing parts that are respectively attached to the inner surfaces of the first and second busing parts. The split bushing and split bearing formation allows the attachment structure to be retrofitted with the igniter rod in place within the guide tube, without requiring it to be dismounted, thus allowing convenient servicing and/or replacement of the parts.

In one embodiment, the bearing is made of bronze and may, for example be glued to the inner surface of the bushing by a suitable adhesive, such as super glue.

In an alternate embodiment, the attachment structure is embodied as an extension tube extending axially outward from the cap toward the cold-end region. The outer surface of the extension tube is configured as the threaded outer surface. The inner surface of the extension tube forms said guide surface for the igniter rod.

In another aspect, a retrofit method is provided for reducing moment loading at a cold-end of an existing gas turbine igniter. The retrofit method includes forming an internal threading on an inner surface of the cap of the igniter at an end portion of the cap that is proximate to the cold-end region, and attaching the above-described retrofit structure (attachment structure) to the end portion of the cap that is proximate to the cold-end region via a threaded connection between the threaded outer surface of the retrofit structure and the threaded inner surface of the cap. Thereby, the inner surface of the retrofit structure forms a guide surface for the igniter rod, at a reduced radial clearance with the igniter rod in comparison to the cap, proximate to the cold-end region.

BRIEF DESCRIPTION OF THE DRAWINGS

Embodiments of the present technique are illustrated in more detail by help of figures. The figures show example configurations and are not meant to be construed as limiting.

DETAILED DESCRIPTION OF INVENTION

Figure 1:
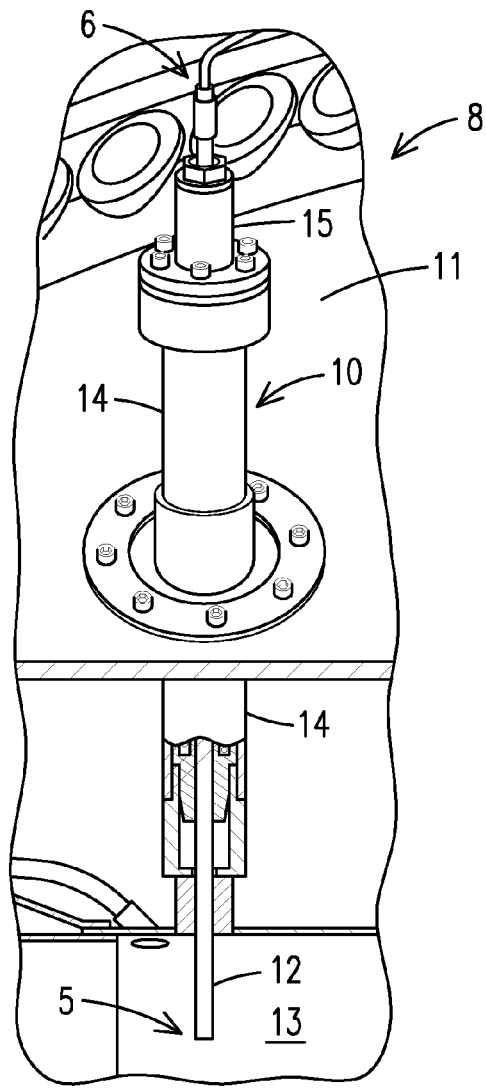
FIG. 1 is a fragmentary view of a gas turbine including an igniter wherein the illustrated embodiments may be incorporated.

Turning now to FIG. 1, a gas turbine 8 is shown, comprising an igniter 10 that may incorporate the illustrated embodiments. The igniter 10 may be mounted in a casing 11 for igniting a combustible mixture in a chamber 13.

The igniter 10 comprises an igniter rod 12 disposed inside a guide tube 14. The igniter rod 12 is capable of traveling within the guide tube 14 between a hot-end region 5 and a cold-end region 6. FIG. 1 depicts an ignition-position wherein the igniter rod 12 is fully extended into the hot-end region 5, which is in the path of the combustible mixture in the combustion chamber 13. After ignition, during turbine operation, the igniter rod 12 is designed to retract away from the hot combustion environment, toward the cold-end region 6. A cap 15 is connected to the cold-end of the guide tube 14, which provides an access passageway for the igniter rod 12.

Figure 2:
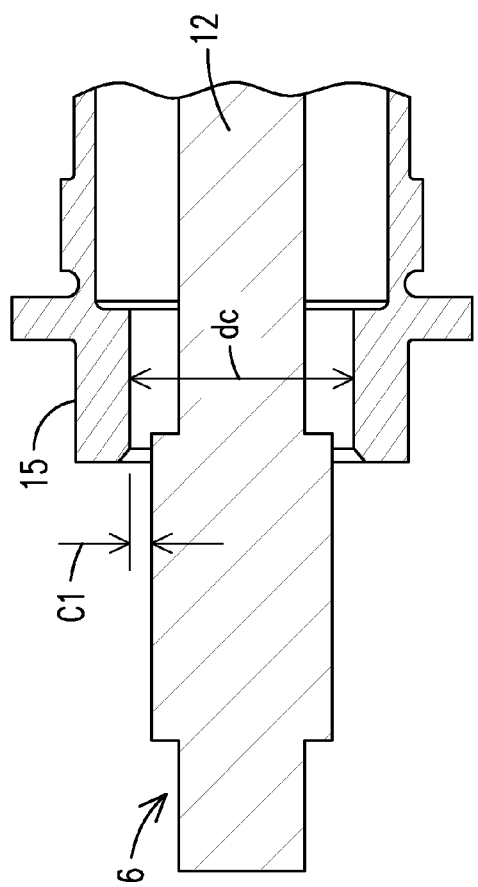
FIG. 2 shows a cross-sectional view of the igniter cap and the igniter rod, with the igniter rod being in an untraveled state.
Figure 3:
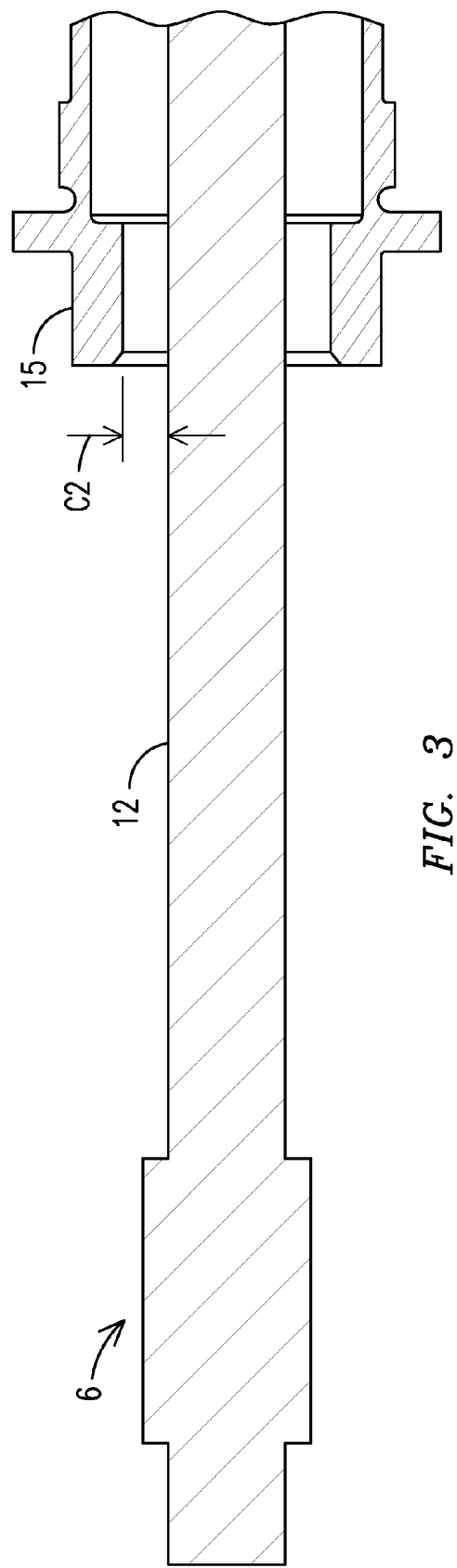
FIG. 3 shows a cross-sectional view of the igniter cap and the igniter rod, with the igniter rod being in a traveled state.

FIGS. 2 and 3 show cross-sectional views of the cap 15 and the igniter rod 12. FIG. 2 illustrates an untraveled state of the igniter rod 12, i.e., an ignition position of the igniter. FIG. 3 illustrates a traveled state of the igniter rod 12, i.e., a retracted position of the igniter. Taking the example of a typical conventional gas turbine igniter, the inner diameter dc of the cap 15 is about 1.09". In this example, the radial clearance C1 between the rod 12 and the cap 15 in the untraveled state is about 0.108", while the radial clearance C2 between the rod 12 and the cap 15 in the traveled state is about 0.242". Especially in the traveled state, the igniter rod 12 is subject to cantilever beam loading (also referred to as moment loading), for example, due to the weight of the igniter rod itself and/or due to the weight of electrical cables (not shown) attached to the cold end of the igniter rod 12. Due the increased radial clearance C2 during the traveled state, the moment loading could cause mechanical pinching between the igniter rod and the guide tube closer to the hot end of the guide tube.

Figure 4:
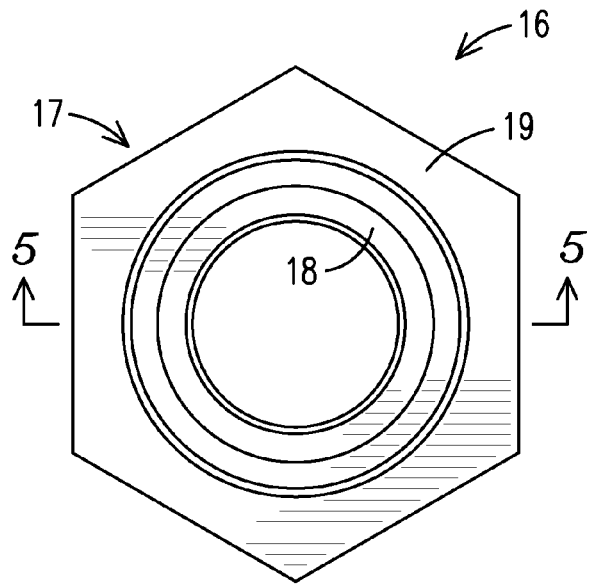
FIG. 4 shows the top view of a first embodiment of an attachment structure embodied as a bus-bearing assembly.
Figure 5:
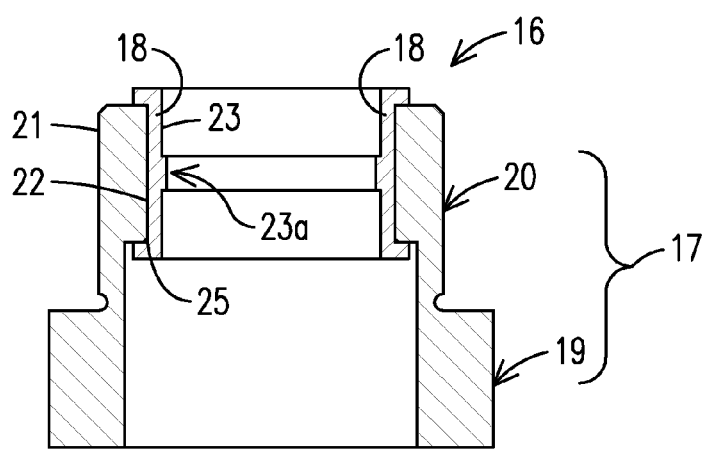
FIG. 5 shows a cross-sectional view of the bushing-bearing assembly of FIG. 4 along the section line 5-5.

FIGS. 4 and 5 respectively illustrate a top view and a cross-sectional view of a first embodiment of an attachment structure, embodied as a bushing-bearing assembly 16, which may be retrofitted to the cap of an igniter of the type illustrated above. Referring jointly to FIGS. 4 and 5, the assembly 16 includes a bushing 17 and a bearing 18. The bushing 17 is formed by a hexagonal stock portion 19 and a cylindrical portion 20. The cylindrical portion 20 is meant to be arranged inside the cold end of the igniter cap 15 and its outer diameter may be sized suitably based on the inner diameter of the igniter cap 15. An outer surface 21 of the cylindrical portion 20 of the bushing 17 is configured to interface with an inner surface 24 of the cap 15 (see FIG. 6-7) in an end portion of the cap 15 proximate to the cold-end region 6 via, a threaded connection. To this end, the outer surface 21 of the cylindrical portion 20 of the bushing 17 is provided with external threading. The bearing 18 may be glued to an inner surface 22 of the cylindrical portion 20 by a suitable adhesive, such as super glue. In the illustrated embodiment, the radially outer surface 25 of the bearing 18 may be stepped, defining a groove to interface with the inner surface 22 of the cylindrical portion 20 of the bushing 17. When assembled, the radially inner surface 23 of the bearing provides a guide surface for the igniter rod 12 to move against. In one embodiment, the inner bearing surface 23 may have a stepped projection 23a to further limit the radial movement of the igniter rod. In the illustrated example, the bearing is made from bronze.

In the illustrated embodiment, bushing-bearing assembly 16 is formed as a split assembly, i.e., split into two halves, for example, along the section line 5-5 in FIG. 4. The bushing 17 as well as the bearing 18 are thus divided two separate halves. During assembly, the two halves may be arranged around the igniter rod 12 without having to dismount the igniter rod 12, and the cylindrical portion of the bushing may then be screwed axially into the cap 15, as depicted in FIGS. 6 and 7.

Figure 6:
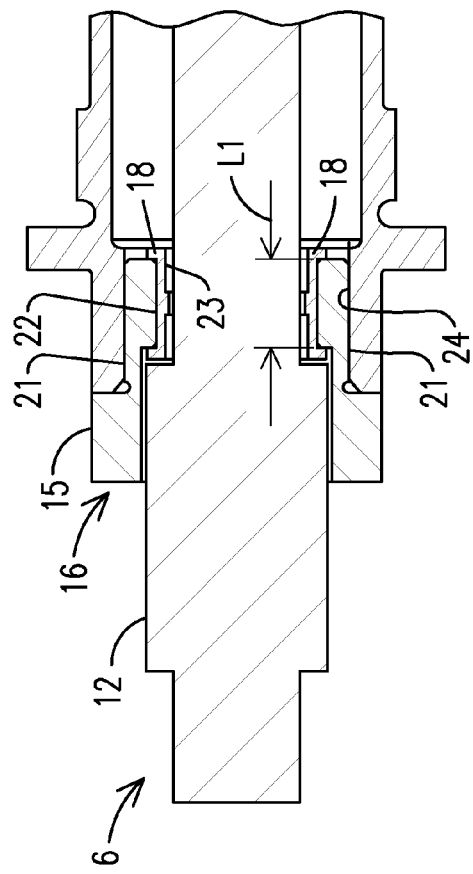
FIG. 6 shows a cross-sectional view after the bushing-bearing assembly has been fitted to the igniter cap, with the igniter rod being in an untraveled state.
Figure 7:
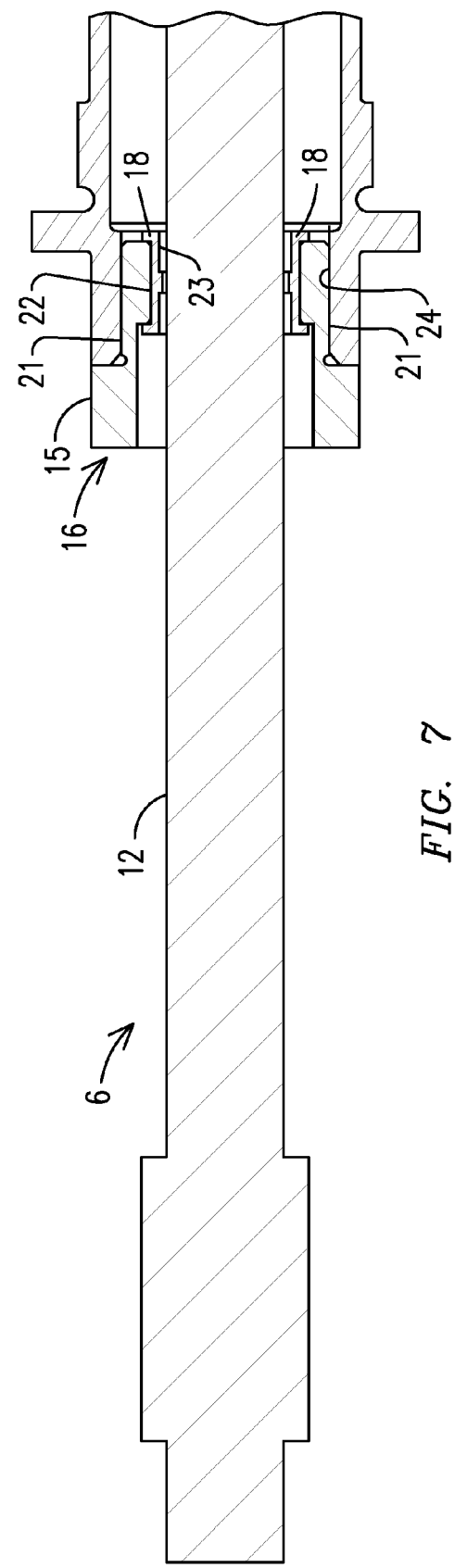
FIG. 7 shows a cross-sectional view after the bushing-bearing assembly has been fitted to the igniter cap, with the igniter rod being in a traveled state.

FIG. 6-7 show a cross-sectional views after the bushing-bearing assembly 16 has been fitted to the igniter cap 15. FIG. 6 illustrates an untraveled state of the rod 12 while FIG. 7 illustrates a traveled state of the rod 12.

For the purpose of attachment of the assembly 16 to the cap 15, the inner surface 24 of the cap 15 (in an end portion of the cap 15 towards the cold end-region 6) is provided with internal threading, which engages with the external threading on the outer surface 21 of the cylindrical portion of the bushing 17. In one embodiment, if an existing cap is used, an initial step of machining the internal diameter of the cap 15 is carried out to suitably increase the inner diameter of the cap 15. For example, if the cap 15 shown in FIG. 2-3 is to be retrofitted with the bushing-bearing assembly 16, the internal diameter may be machined to a value of about 1.313".

Upon attachment of the assembly 16 to the cap 15, the radially inner surface 23 of the bearing forms a suitable guide surface for the igniter rod 12 to move against, with significantly reduced radial clearance. In the exemplary embodiment, the bearing length L1 in the axial direction may be about 0.625".

Figure 8:
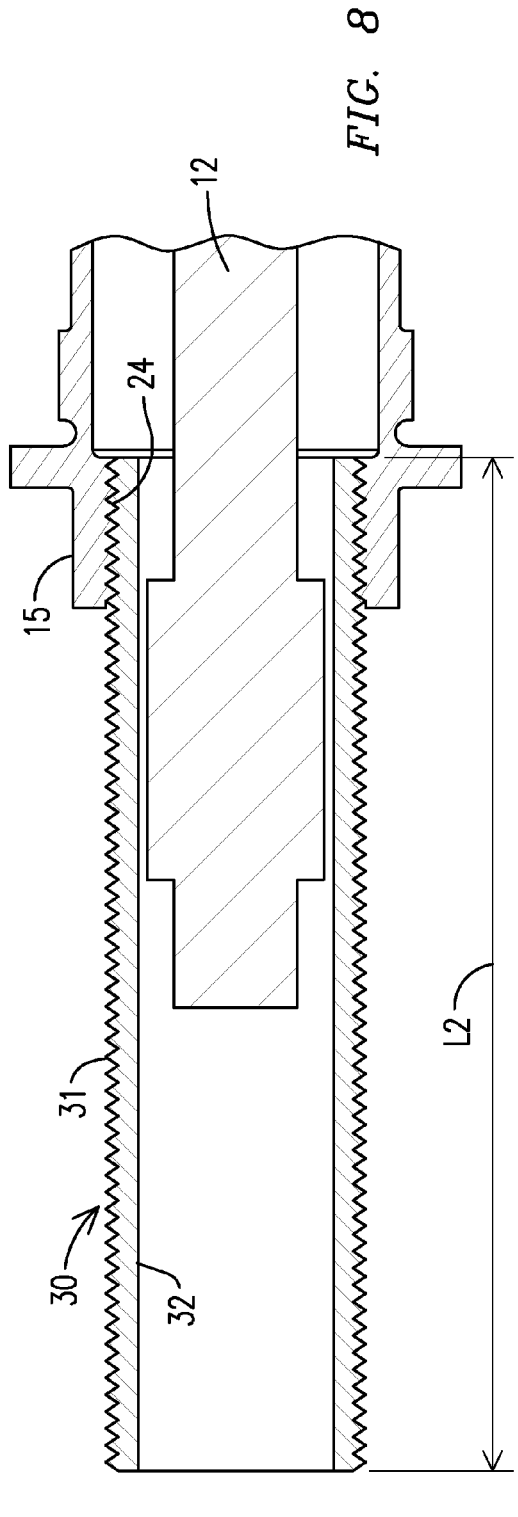
FIG. 8 shows a cross-sectional view of a second embodiment of an attachment structure, embodied as an extension tube, with the igniter rod being in an untraveled state.
Figure 9:
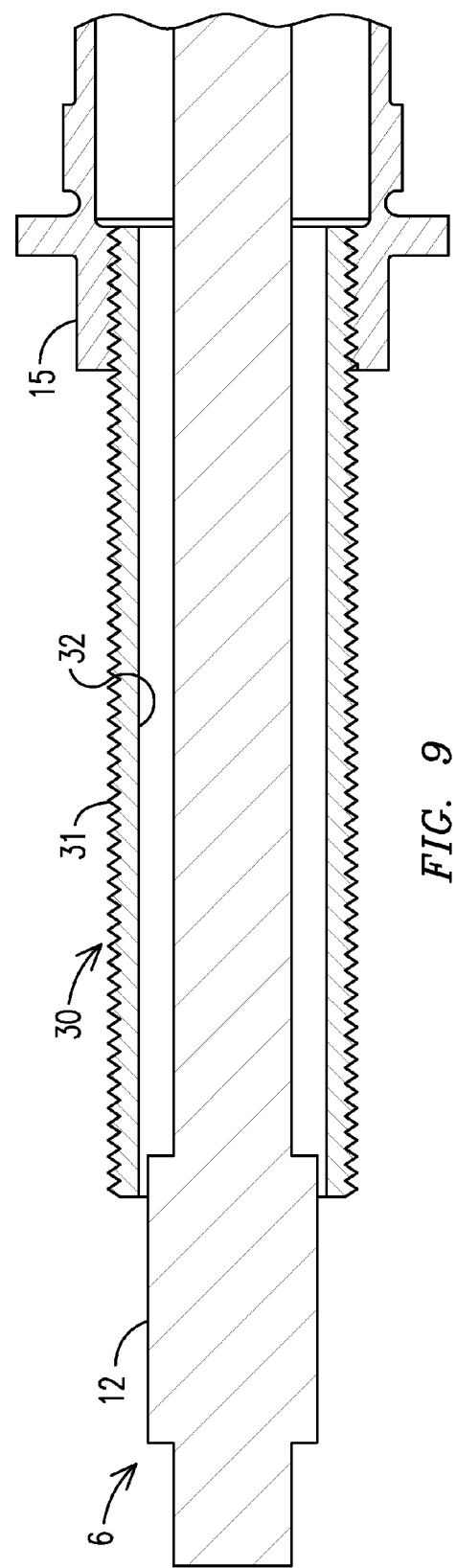
FIG. 9 shows a cross-sectional view of a second embodiment of an attachment structure, embodied as an extension tube, with the igniter rod being in a traveled state.

A second embodiment of an attachment structure 30 is illustrated in FIGS. 8 and 9, which respectively show untraveled and traveled states of the igniter rod 12. The attachment structure 30 is an extension tube 30. The outer diameter of the extension tube 30 is sized such that it is insertable into the cap 15 via a threaded connection. To that end, the outer surface 31 of the extension tube is externally threaded, that engages in a threaded connection with the threaded inner surface 24 of the cap 15. The inner diameter of the extension tube is sized to provide minimal radial clearance with respect to cold-end of the rod 12. The inner surface 32 of the extension tube 30 forms said guide surface for the igniter rod 12 to move against. The length of the extension tube is sized such that it extends axially outward from the cap 15 toward the cold end. In the present example the extension tube 30 offers a guide length L2 of about 5.0".

While specific embodiments and dimensions have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A gas turbine igniter, comprising:
   an igniter rod configured for travel between a hot-end region and a cold-end region within a guide tube,
   a cap connected to the guide tube, the cap defining an access passageway for the igniter rod,
   a bushing attachable to an end portion of the cap that is proximate to the cold-end region, the bushing having an inner surface and an outer surface, wherein an outer surface of the bushing is threaded to engage with a threaded inner surface of the cap in said end portion of the cap, wherein a bearing is attached to the inner surface of the bushing, and wherein the inner surface of the bearing defines a guided path for the igniter rod within the cap proximate to the cold-end region.

2. The gas turbine igniter according to claim 1, wherein the bushing is formed as split bushing having first and second bushing parts, and the bearing is formed as a split bearing having first and second bearing parts that are respectively attached to the inner surfaces of the first and second busing parts.

3. The gas turbine igniter according to claim 1, wherein the bearing is formed from bronze.

4. The gas turbine igniter according to claim 1, wherein the bearing is glued to the inner surface of the bushing.

5. A retrofit structure for a gas turbine igniter, the igniter comprising an igniter rod disposed within a guide tube and configured for travel between a hot-end region and a cold-end region, and a cap connected to the guide tube, the cap defining an access passageway for the igniter rod, the retrofit structure comprising:

a bushing comprising a threaded outer surface configured to engage in a threaded connection with a threaded inner surface of the cap in an end portion of the cap that is proximate to the cold-end region, such that the retrofit structure is attachable to said end portion of the cap via said threaded connection, and a bearing attached to an inner surface of the bushing, the bearing comprising an inner surface forming a guide surface for the igniter rod, at a reduced radial clearance with the igniter rod in comparison to the cap, proximate to the cold-end region.

6. The retrofit structure according to claim 5, wherein the bushing is formed as split bushing having first and second bushing parts, and the bearing is formed as a split bearing having first and second bearing parts that are respectively attached to the inner surfaces of the first and second busing parts.

7. The retrofit structure according to claim 6, wherein the bearing is formed of bronze.

8. A retrofit method for reducing moment loading at a cold-end of a gas turbine igniter, the igniter comprising an igniter rod disposed within a guide tube and configured for travel between a hot-end region and a cold-end region, and a cap connected to the guide tube, the cap defining an access passageway for the igniter rod, the retrofit method comprising:

forming an internal threading on an inner surface of the cap at an end portion of the cap that is proximate to the cold-end region, and attaching the retrofit structure of claim 5 to the end portion of the cap that is proximate to the cold-end region via a threaded connection between the threaded outer surface of the retrofit structure and the threaded inner surface of the cap, wherein the inner surface of the retrofit structure forms a guide surface for the igniter rod, at a reduced radial clearance with the igniter rod in comparison to the cap, proximate to the cold-end region.

9. The method according to claim 8, further comprising a machining operation to increase an inner diameter of the cap prior to forming the internal threading.

* * * * *